United States Patent [19]
Dickens, Jr. et al.

[11] Patent Number: 5,342,919
[45] Date of Patent: Aug. 30, 1994

[54] SINTERABLE SEMI-CRYSTALLINE POWDER AND NEAR-FULLY DENSE ARTICLE FORMED THEREWITH

[75] Inventors: Elmer D. Dickens, Jr., Richfield; Biing Lin Lee, Broadview Heights; Glenn A. Taylor, Twinsburg; Angelo J. Magistro, Brecksville; Hendra Ng, E. Cleveland, all of Ohio

[73] Assignee: DTM Corporation, Auston, Tex.

[21] Appl. No.: 980,004

[22] Filed: Nov. 23, 1992

[51] Int. Cl.5 .................... C08G 69/14; B27N 3/00
[52] U.S. Cl. ..................... 528/323; 528/310; 156/62.2
[58] Field of Search ............... 528/310, 323; 156/62.2

[56] References Cited

U.S. PATENT DOCUMENTS

| | | | |
|---|---|---|---|
| 4,247,508 | 1/1981 | Housholder | 264/219 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,063,183 | 11/1991 | Taniguchi et al. | 501/96 |
| 5,132,143 | 7/1992 | Deckard | 427/197 |
| 5,182,170 | 1/1993 | Marcus et al. | 428/551 |

*Primary Examiner*—John Kight, III
*Assistant Examiner*—T. Mosley
*Attorney, Agent, or Firm*—Alfred D. Lobo; Nestor M. Shust

[57] ABSTRACT

A laser-sinterable powder product has been prepared having unique properties which allow the powder to be sintered in a selective laser sintering (SLS) machine to form a sintered part which is near-fully dense. For most purposes, the sintered part is indistinguishable from another part having the same dimensions made by isotropically molding the powder. In addition to being freely flowable at a temperature near its softening temperature, the powder has a two-tier distribution in which substantially no primary particles has an average diameter greater than 180μm, provided further that the number average ratio of particles smaller than 53μm is greater than 80%, the remaining larger particles being in the size range from 53μm to 180μm. When the powder is a semicrystalline synthetic resin having a number average molecular weight in the range from about 30,000 to 500,000; a molecular weight distribution $M_w/M_n$ in the range from 1 to 5; and, provides a window of sinterability in the temperature range from near the powder's softening temperature $T_s$ to its caking temperature $T_c$, it is sintered layer-upon layer to form a near-fully dense part of arbitrary shape.

16 Claims, 5 Drawing Sheets

SINTERABLE SEMI-CRYSTALLINE POWDER AND NEAR-FULLY DENSE ARTICLE FORMED THEREWITH

BACKGROUND OF THE INVENTION

This invention relates to a synthetic resinous powder product to be laser-sintered in a Selective Laser Sintering ® (SLS ®) machine. The laser-sinterable powder (referred to as "SLS powder" herein) is "designed" or "tailored" to incorporate specific physical properties uniquely adapted to form a bed (of powder) upon which a sintering laser in the infra-red region is directed.

Prior art SLS powders are ;unable to yield a sintered part which, for most purposes, appears to be a duplicate of one which is isotropically molded. Moreover, conventional SLS powders form a bed which generally lacks the ability to provide the exigent heat transfer characteristics which determine whether a sintered part will be distorted, even if it is successfully completed. Since a layer of particles typically rolled out of the feed bed and onto the part bed of a SLS machine, is about 8 mils (200$\mu$m) such powders used had a maximum particle diameter which was less than 200$\mu$m and whatever "fines" were generated in the course of grinding the powder to the desired mesh size, irrespective of the distribution of particle sizes in the powder.

The SLS powder of this invention yields a sintered article ("part") which, though porous, not only has the precise dimensions of the part desired, but also is so nearly fully dense (hence referred to as "near-fully dense") as to mimic the flexural modulus and maximum stress at yield (psi), of the article, had it been fully dense, for example, if it had been isotropically molded.

In addition, the properties deliberately inculcated in the SLS powder are unexpectedly effective to provide the bed with sufficient porosity to permit cooling gas to be flowed downwardly through it, yet maintaining a quiescent bed in which the sintered part mimics the properties of a molded article.

The term "near-fully dense" refers to a slightly porous article which has a density in the range from 80%–95% (void fraction from 0.2 to as low as 0.05), typically from 85%–90% of the density (void fraction 0.15–0.1) of a compression molded article which is deemed to be fully dense.

The term "fully dense" refers to an article having essentially no measurable porosity, as is the case when an article of a synthetic resinous powder is compression (or injection) molded from a homogeneous mass of fluent polymer in which mass individual particles have lost their identity.

By a "quiescent bed" we refer to one upon the surface of which the particles are not active, that is, do not move sufficiently to affect the sintering of each layer spread upon a preceding slice sintered in the part bed. The bed is not disrupted by the downward flow of gas, so that the bed appears to be static.

To date, despite great efforts having been focussed on a hunt for the formulation of a SLS powder which will yield a near-fully dense part, that formulation has successfully eluded the hunt. The goal is therefore to produce a mass of primary particles of a synthetic resin which has properties specifically tailored to be delivered by a roller to the "part bed" of a SLS machine, then sintered into a nearfully dense prototype of a fully dense article.

A powder dispenser system deposits a "layer" of powder from a "powder feed bed" or "feed bed" into a "part bed" which is the target area. The term "layer" is used herein to refer to a predetermined depth (or thickness) of powder deposited in the part bed before it is sintered.

The term "prototype" refers to an article which has essentially the same dimensions of a compression or injection molded article of the same material. The porous prototype is visually essentially indistinguishable from the molded article, and functions in essentially the same manner as the molded article which is non-porous or fully dense. The flexural modulus, flexural strength and flexural elongation at yield, are essentially indistinguishable from the values obtained for a molded article. One is distinguishable from the other only because the prototype has a substantially lower, typically less than one-half, the ultimate tensile elongation (%), and notched Izod impact (ft-lb/in), than a compression molded article, though the prototype's tensile modulus, tensile strength, and elongation at yield are substantially the same as those of the compression molded article (see Table 1 on pg 33). In Table 1, the values given in square brackets are the standard deviations under the particular conditions under which the measurements were made.

The tensile elongation, ultimate (%), and notched Izod impact are lower for the prototype because of its slight porosity. Therefore the energy to break, which is the area under the stress curve up to the point of break at ultimate elongation, is also very much lower than that for the compression molded article. As is well known, any small imperfections in a homogeneous article will be reflected in the ultimate tensile elongation and notched Izod impact. However, confirmation that the molded article has been closely replicated is obtained by a comparison of the fracture surfaces of the prototype and of the molded article. Photomicrographs show that these fracture surfaces of the prototype are visually essentially indistinguishable from fracture surfaces of an isotropically molded non-porous part except for the presence of a profusion of cavities having an average diameter in the range from 1$\mu$m–30$\mu$m randomly scattered throughout said part, indicating similar creep and fatigue characteristics. As one would expect, the cavities provide evidence of the porosity of the prototype. Therefore it is fair to state that, except for the lower ultimate elongation or Izod impact of the prototype, due to its slight porosity, the prototype fails in the same manner as the molded article.

A laser control mechanism operates to direct and move the laser beam and to modulate it, so as to sinter only the powder disposed within defined boundaries (hence "selectively sintered"), to produce a desired "slice" of the part. The term "slice" is used herein to refer to a sintered portion of a deposited layer of powder. The control mechanism operates selectively to sinter sequential layers of powder, producing a completed part comprising a plurality of slices sintered together. The defined boundaries of each slice corresponds to respective cross-sectional regions of the part. Preferably, the control mechanism includes a computer—e.g. a CAD/CAM system to determine the defined boundaries for each slice. That is, given the overall dimensions and configuration of the part, the computer determines the defined boundaries for each slice and operates the laser control mechanism in accordance with the defined boundaries for each slice. Alternatively, the computer can be initially programmed with the defined boundaries for each slice.

The part is produced by depositing a first portion of sinterable powder onto a target surface of the part bed, scanning the directed laser over the target surface, and sintering a first layer of the first portion of powder on the target surface to form the first slice. The powder is thus sintered by operating the directed laser beam within the boundaries defining the first slice, with high enough energy (termed "fluence") to sinter the powder. The first slice corresponds to a first cross-sectional region of the part.

A second portion of powder is deposited onto the surface of the part bed and that of the first sintered slice lying thereon, and the directed laser beam scanned over the powder overlying the first sintered slice. A second layer of the second portion of powder is thus sintered by operating the laser beam within the boundaries which then define the second slice. The second sintered slice is formed at high enough a temperature that it is sintered to the first slice, the two slices becoming a cohesive mass. Successive layers of powder are deposited onto the previously sintered slices, each layer being sintered in turn to form a slice.

Repetition of the foregoing steps results in the formation of a laser-sintered article lying in a "part bed" of powder which continually presents the target surface. If the particles of powder at the boundaries of each layer are overheated sufficiently to be melted, unmelted particles immediately outside the boundaries adhere to the molten particles within, and the desired sharp definition of the surface of the sintered article is lost. Without sharp definition at the boundaries the article cannot be used as a prototype.

It is therefore essential that the particles of powder adjacent the surfaces of the article to be formed, resist being strongly adhered to those surfaces. When particles are not so strongly adhered they are referred to as "fuzz" because fuzz is easily dislodged from the surface, manually, and the dislodged particles retain most of their individual identities. Particles so tightly adhered to the surface as to be removed satisfactorily only with a machining step, are referred to as "growth". Such growth makes a sintered part unfit for the purpose at hand, namely to function as a prototype for a compression molded part.

A method for sintering a powder into a shaped article in a SLS machine is disclosed in U.S. Pat. Nos. 4,247,508 to Housholder; 4,863,538 and 5,132,143 to Deckard; 4,938,816 to Beaman et al; and, 4,944,817 to Bourell et al, the relevant disclosure of each of which is incorporated by reference thereto as if fully set forth herein. "Sintering" is defined as the heating of the powder to a temperature which causes viscous flow only at contiguous boundaries of its particles, with at least some portion of substantially all particles remaining solid. Such sintering causes coalescence of particles into a sintered solid mass the bulk density of which is increased compared to the bulk density of the powder particles before they were sintered; and, a part formed by "slice-wise" joining of plural vertically contiguous layers which are sintered into stacked "slices" is therefore said to be autogenously densified. A layer of powder is confined by vertically spaced apart horizontal planes, no more than about 250μm apart and each slice is typically in the range from 50μm to 180μm thick.

The specific goal of this invention is to produce a sinterable powder of a single, that is, unblended, synthetic resin the molecular weight range and molecular weight distribution of which may be controlled to produce a powder which, when exposed to the laser beam, is heated so that the outer portions of each particle have a narrowly defined range of viscosity which results in the fusion of successive slices.

It must be remembered that before the powder can be sintered in the part bed, it must be delivered from the feed bed to the part bed upon which the powder is distributed in a thin, even layer about 125μm thick, by the roller of the SLS. It is essential that each distributed layer be thin and evenly distributed because the temperature gradient through the cross-section of the sintered slice must be small, typically <5° C. more preferably <2° C., and most preferably <1° C. To meet this demanding criterion, the powder must be freely flowable from the feed bed onto the part bed.

By "freely flowable" we refer to a mass of small particles, the major portion of which, and preferably all of which have a sphericity of at least 0.5, and preferably from 0.7 to 0.9 or higher, so that the mass tends to flow steadily and consistently as individual particles. Though such flow is conventionally considered a characteristic of a powder which flows through an orifice slightly larger than the largest particle, such flow (through an orifice) is of less importance than the ability of the powder to be picked up in the nip of a rotating roller and transported by it as an elongated fluent mass of individual particles urged along by the roller. A freely flowable powder has the critical property of being able to be urged as a dynamic elongated mass, referred to as a "rolling bank" of powder, by the rotating roller, even at a temperature near $T_s$.

At the "softening point" $T_s$ of the tailored powder, the powder is on the verge of not being flowingly transportable as a rolling bank against a rotating roller. By "softening point" we refer to $T_s$, at which a powder's storage modulus ($G'_s$) has decreased substantially from its value of $G'_s$ at room temperature. At or above $T_s$ the storage modulus $G'$ of a sintered slice of the powder is low enough so as not to let it "curl". By "curl" we refer to the slice becoming non-planar, one or more portions or corners of the slice rising more than about 50μm above the surface of the last (uppermost) slice in the horizontal x-y-plane.

A slice will curl when there is a too-large mismatch between the temperature of the initial slice sintered by the laser and the bed of powder on which it lies; or, between powder freshly spread over a just-sintered slice and the temperature at the upper interface of the slice and the freshly spread powder. Such a mismatch is the result of "differential heating". The importance of countering curl is most critical when the first slice is formed. If the first slice curls, the roller spreading the next layer of powder over the slice will push the slice off the surface of the part bed.

If the powder is transported from the feed bed to the part bed in which a hot slice is embedded, and the temperature at the interface $T_i$ between the hot upper surface of the slice and the freshly spread powder is high enough to raise the temperature of the freshly spread powder above $T_s$, this powder cannot be rollingly distributed over the hot slice because the powder sticks and smears over the hot slice. The indication is that the slice is too hot.

If the powder in the feed bed is too cool, that is, so cool that the equilibrium temperature on the surface of the hot, embedded slice is such that the temperature of the freshly spread powder is below $T_s$, the slice will curl.

The slice will not curl when the powder spread over it reaches an equilibrium temperature at the interface, and the equilibrium temperature is at or above $T_s$. The precise temperature $T_i$ at the interface is difficult to measure, but to form successive slices cohesively sintered together, the temperature of the powder at the interface must be above $T_s$, but below the powder's "sticky point" or "caking temperature" $T_c$ at which the powder itself will not flow.

By "sticky" we infer that the force required to separate contiguous particles has exceeded an acceptable limit for the purpose at hand. This caking temperature $T_c$ is reached when the critical storage modulus ($G'_c$) of the powder has been reached or exceeded. The storage modulus is a property of the powder akin to a material's tensile strength and can be measured directly with a Rheometrics dynamic mechanical analyzer.

To form a sintered part in a SLS machine, an initial slice is sintered from powder held in the part bed at near $T_s$ but well below $T_c$. By "near $T_s$" we refer to a temperature within about 5° C. of $T_s$, that is $T_s \pm 5$, preferably $T_2 \pm 2$.

Immediately after the initial slice is formed, the slice is much hotter than the powder on which it rests. Therefore a relatively cool powder, as much as about 40° C., but more typically about 20° C. below its $T_s$, may be spread over the hot slice and the interface temperature raises the temperature of the powder to near $T_s$. As the powder is spread evenly over the hot slice it is to remain cool enough to be spread, but soon thereafter, due to heat transfer at the interface, must reach or exceed $T_s$, or the just-sintered slice will curl; that is, the temperature of the powder must enter the "window of sinterability". This window may be measured by running two DSC (differential scanning calorimetry) curves on the same sample of powder, sequentially, with a minimum of delay between the two runs, one run heating the sample past its melting point, the other run, cooling the sample from above its melting point until it recrystallizes. The difference between the onset of melting in the heating curve, Tm, and the onset of supercooling in the cooling curve, Tsc, is a measure of the width of the window of sinterability (see FIG. 6).

To ensure that the powder from the feed bed will form a rolling bank even when it is rolled across the hot slice, the powder is usually stored in the feed bed at a storage temperature in the range from 2° C. to 40° C. below the powder's $T_s$ and transferred at this storage temperature to the part bed, the feed bed temperature depending upon how quickly a layer of powder spread over a just-sintered slice enters the window of sinterability. The $T_s$ may be visually easily obtained—when the powder is too hot to form a rolling bank, it has reached or exceeded its $T_s$.

It will now be realized that the cooler the powder (below $T_s$) the higher the risk of curling, if the interface temperature is not high enough to raise the temperature of the layer of powder at least to $T_s$. A commensurate risk accrues with a powder stored at too high a temperature. The storage temperature is too high, though the powder forms a rolling bank, when the powder smears or sticks as it traverses the slice, an indication that the powder overlying the slice has not only exceeded $T_s$ but also reached (or gone beyond) $T_c$.

Thus, though it is difficult to measure the interface temperature, or to measure $T_c$ with a temperature probe, so as to measure the width of the window, it can be done visually. When the rolling bank of powder sticks or smears over the last-sintered slice, the $T_c$ of the powder has been reached or exceeded. Thus with visual evidence once can determine the temperature range ($T_c$-$T_s$) which is the window of sinterability or the "SLS operating window", so referred to because the powder cannot be sintered successfully at a temperature outside this SLS-window. (see FIG. 6).

At the start of a sintering cycle it is best to maintain the temperature of the upper layer of the part bed at $T_s$, preferably 0.5°–2° C. above $T_s$ so that the uppermost layer is presented to the laser beam in the SLS window. After the first slice is formed, feed is rolled out from the feed bed at as high a temperature as will permit a rolling bank of powder to be transferred to the part bed. The most desirable powders are freely flowable in a rolling bank at a temperature only about 5° C. below their $T_s$.

However, as the mass of the sintered slices accumulates in the part bed, the sintered mass provides a large heat sink which transfers heat to each layer of powder freshly spread over the hot mass, thus allowing a relatively cool powder, as much as 30° C., more typically 20° C., lower than $T_s$ to be transferred from the feed bed, yet quickly come to equilibrium in the SLS window as the layer is spread over the last preceding slice. Thus, when each layer is sintered, the later-formed slices will not curl.

It is critical that the powder be "freely flowable" from the feed bed at a temperature sufficiently near $T_s$ to ensure that the last-sintered slice will not curl when the powder is spread upon it. As already pointed out above, if the first slice formed curls, no further progress can be made. A fresh start must be made to sinter the part.

A powder is not freely flowable when the temperature at which it is held or distributed exceeds its softening point. The powder cakes and does not flow at all when the caking temperature is reached At $T_c$, $G'_s$ decreases to a critical $G'_c$. The caking temperature $T_c$ is also referred to as the "$G'_c$ temperature".

It is possible to transfer powder from the feed bed to the part bed at above $T_s$ if the impaired flowability allows one to do so, and the risk of operating too close to $T_c$ is acceptable. Generally a powder does not form a rolling bank at or above its $T_s$.

It will now be evident that an essential property of the tailored powder is that it be sinterable in a desirably wide SLS window. Though within narrow limits, the 'width' (in °C.) of the window, varies from the start of the cycle and at the end (particularly when a large part is formed, as explained above). The width of the window also varies depending upon the composition of the powder. This width ranges from about 2° C. to about 25° C.; more typically, it is about 5°C.–15° C. With a powder which is freely flowable over a wide temperature range, one is able to form, in the best mode, a solid, near-fully dense article when the powder is sintered in a SLS machine which uses a roller to spread the powder.

The temperature at which $G'_s$ is measured is not narrowly critical provided the $G'_c$ temperature offers an adequately large SLS-window. Most desirable laser-sinterable powders have an unexpectedly-common characteristic, namely that the value of their $G'_c$ is narrowly defined in the range from $1 \times 10^6$ dynes/cm$^2$ to $3 \times 10^6$ dynes/cm$^2$.

For a crystalline powder (100% crystallinity), the softening point is its melting point Tm. Therefore $G'_s$ and $G'_c$ are essentially identical and there is no $G'$-window. For an amorphous powder, its softening point is its initial glass transition temperature Tg. An amorphous powder can offer a large window of sinterability but because its viscosity decreases too slowly as temperature increases and the $G'_c$ limit of the SLS-window is approached, the viscosity is still too high. That is, the viscosity is too high to allow requisite interchain diffusion at the boundaries of the particles without melting the entire particle. Therefore an amorphous powder is difficult to sinter to near-full density, so that powders which qualify as the product of this invention are semi-crystalline powders such as nylon, polybutylene terephthalate (PBT) and polyacetal (PA) which provide signs of crystalline order under X-ray examination, and show a crystalline melting point Tm as well as a glass transition temperature Tg. Because the crystallinity is largely controlled by the number and distribution of branches along the chain, the crystallinity varies, bulky side chains or very long chains each resulting in a reduction of the rate of crystallization. Preferred polymers have a crystallinity in the range from 10%- 90%, more preferably from 15%-60%.

To summarize, the SLS process is used to make 3-D objects, layer-upon-layer sequentially and in an additive manner. The process is more fully described in the '538 Deckard patent and comprises the following steps: (1) Powder from the feed bed is "rolled out" by a roller, to a part bed where the powder is deposited and leveled into a thin layer, typically about 125μm (0.005") in depth. (2) Following a pattern obtained from a two dimensional (2-D) section of a 3-D CAD model, a CO2 laser "sinters" the thin layer in the target region of the part bed and generates a first slice of sintered powder in a two-dimensional ("2-D") shape. Directions for the pattern, and each subsequent pattern for successive slices corresponding to a desired three-dimensional ("3-D") prototype are stored in a computer-controller. It is critical for a slice-upon-slice construction of the prototype that the laminar, planar shape of each slice of sintered powder be maintained, that is, "without curling". (3) A second layer of powder from the feed bed is then deposited and leveled over the just-sintered layer in the part bed, forming a second slice sintered to the first slice. (4) The computer-controller makes incremental progress to the next 2-D section, the geometry of which is provided from the 3-D model, and instructs the laser/scanner system to sinter the regions of the bed desired for successive 2-D sections. (5) Still another layer of powder is deposited from the feed bed and leveled over the just-sintered layer in the part bed. (6) The foregoing steps are repeated, seriatim, until all layers have been deposited and sequentially sintered into slices corresponding to successive sections of the 3-D model. (7) The sintered 3-D object is thus embedded in the part bed, supported by unsintered powder, and the sintered part can be removed once the bed has cooled. (8) Any powder that adheres to the 3-D prototype's surface as "fuzz" is then mechanically removed. (9) The surfaces of the 3-D prototype may be finished to provide an appropriate surface for a predetermined use.

This invention relates mainly to producing and using a powder which is designed to satisfy the requirements of the first three steps of the process.

Although we have experimentally processed many synthetic resinous powders in the SLS machine, we have found that few make near-fully dense parts. In most cases the measured values of flexural modulus and maximum stress at yield are at least 30% lower than values obtained made by injection or compression molding the same part. We now understand, and have set forth below, what critical properties are required of a powder which can be successfully sintered in a SLS machine, and have accepted, at least for the time being, the many disappointing results we obtained with amorphous polymers such as polycarbonate (PC) and acrylonitrile-butadiene-styrene resins (ABS).

It has now become evident that a semi-crystalline or substantially crystalline organic polymer is the powder of choice if it is to provide the high definition of surface ("lack of growth") which a prototype made from the tailored powder of this invention, provides.

By a "semi-crystalline polymer" or "substantially crystalline polymer" is meant a resin which has at least 10% crystallinity as measured by DSC, preferably from about 15%-90%, and most preferably from about 15-60% crystallinity.

In copending patent application Ser. No. 727,746 filed by Shimandle on Jul. 10, 1991 it was taught that to produce a sintered article of wax having a void fraction (porosity) of 0.1, a two-tier weight distribution of wax particles was necessary. The desired two-tier distribution was produced by a process which directly generated a mass of wax microspheres such that more than half (>50%) the cumulative weight percent is attributable to particles having a diameter greater than a predetermined diameter (100μm is most preferred for the task now at hand) for the particular purpose of packing at least some, and preferably a major portion of the interstitial spaces between larger particles, with smaller ones.

The '746 two-tier distribution was arrived at by recognizing that the densest packing of uniform spheres produces a void fraction (porosity) of 0.26 and a packing fraction of 0.74 as illustrated in FIG. 1; and further, by recognizing that the packing factor may be increased by introducing smaller particles into the pore spaces among the larger spheres. As will be evident, the logical conclusion is that the smaller the particles in the pore spaces, the denser will be the packed powder (as illustrated in FIG. 2), and the denser will be the part sintered from the powder.

As will further be evident, the greater the number of small particles relative to the large, in any two-tier distribution, the denser will be the part. Since the goal is to provide a near-fully dense part, logic dictates that one use all small particles, and that they be as small as can be.

However, a mass of such uniformly small particles is not freely flowable. To make it freely flowable one must incorporate larger particles into the mass, much in the same manner as grains of rice are commonly interspersed in finely ground table salt in a salt shaker. Therefore, the tailored powder is a mixture of relatively very large and relatively very small particles in a desirable two-tier particle size distribution for the most desirable sinterable powders.

The demarcation of size in the two-tier distribution and the ratio of the number of small particles to the number of large particles, set forth herebelow, are both dictated by the requirements of the SLS machine.

Further it was found that the rate of heat transfer into the mass of a small particle is so much higher than that into the mass of a large particle, that one could not know either just how large the particles in the upper tier should be, nor how many of such large particles could be present. If the heat transfer to small particles in the bed adjacent the boundaries of each layer was too high, unacceptable growth is generated. If the heat transfer is not high enough, the large particles, namely those >53μm, in the layer are not sintered, thus forming a defective slice. It is because essentially all these large particles are sintered without being melted, and a substantial number of the small particles <53μm are melted sufficiently to flow into and fill the interstices between sintered large particles, that the finished sintered part is near-fully dense. Under successful sintering conditions to form a near-fully dense part, the temperature of the powder must exceed $T_s$ in less time than is required to melt the large particles >53μm. If the time is too long, large particles will melt and there will be growth on the surfaces of the part; if the time is too short, all the large particles are not sintered. Thus the large particles not only help form a rolling bank, but also fill an essential role to maintain the desired transient heat transfer conditions.

Still further, for the reasons given above, only a substantially crystalline powder which does not melt sharply, lends itself to the purpose at hand, and only when the powder is stripped of substantially all too-large particles (termed "rocks") larger than 180μm (80 mesh, U.S. Standard Sieve Series). By "substantially all" we mean that at least 95% of the number of "rocks" in the powder are removed.

It was thus found that a laser-sinterable powder in the proper size range of from about 1μm-180μm, is defined by two critical quantifiable physical properties specified by (i) narrowly defined particle size range and size in a two-tier distribution, and, (ii) the "SLS-window".

The unexpected effect of using the tailored powder with a defined SLS-window is supported by evidence of the sinterability of the powder in this window. The SLS-window is directly correlatable to the powder's fundamental properties defined by its $G'_c$ temperature.

More surprising is that, despite the much larger number of small particles than large in the part bed, it is possible to flow the stream of cooling gas (nitrogen) downwardly through the quiescent bed at low enough a pressure so as not to disturb the particles on and near the surface of the bed sufficiently to cause movement noticeable by the naked eye (hence referred to as "quiescent"). One would expect the pressure drop through a bed of very fine particles, more than 80% of which are smaller than 53μm (270 mesh) to be relatively high. But the presence of the large particles, coupled with the fact that the powder is delivered from the feed bed and distributed evenly by a roller, rather than being pressed onto the bed, unpredictably provides the requisite porosity in the range from 0.4 to 0.55 to allow throughflow of a gas at superatmospheric pressure in the range from 103 kPa (0.5 psig) to 120 kPa (3 psig), preferably from 107–115 kPa (1–2 psig) with a pressure drop in the range from 3–12 kPa, typically 5–7 kPa, without disturbing a quiescent part bed 30 cm deep.

The part bed formed by the tailored powder is unique not only because its specific use is to generate lasersintered parts, but because the bed's narrowly defined porosity and defined particle size provides "coolability". In operation, the powder in the part bed is heated by a multiplicity of hot sintered slices to so high a temperature that the powder would reach its caking temperature $T_c$ if the hot bed could not be cooled.

An identifying characteristic of a preheated 'part bed' of powder with primary particles in the proper size range, stripped of rocks >180μm, is that the bed is not too tightly packed to permit the flow of cooling gas through the bed. This characteristic allows the part bed to be maintained, during operation sintering a part, with a specified temperature profile which allows formation of a distortion-free sintered part as it is formed slicewise; and also, after the sintered part is formed, and the part lies in the heated part bed. By "distortion-free" is meant that no linear dimension of the part is out of spec more than ±250μm, and no surface is out of plane by more than ±250μm (20 mils).

Though the importance of a two-tier particle size weight distribution was disclosed with respect specifically to wax particles in the copending '746 application, it was not then realized that the ranges of particle sizes in each tier of the two-tier distribution controlled both, the density of the sintered part and the sinterability of the powder. Neither was it known that the distribution of particle sizes in a two-tier distribution was as critical as the viscosity characteristics of the material as a function of temperature.

The ranges of sizes in the two-tier distribution of particles used in the novel powder is different from the ranges of the two-tier distribution of Shimandle's wax powder. Quite unexpectedly, the formation of a near-fully dense sintered part requires that at least 80% of the number of all particles in the bed are from 1μm–53μ and that there be substantially no (that is, <5%) particles greater than 180 m (80 mesh) in a part bed. The importance of the few "large particles" to maintain (i) freeflowability near $T_s$ and (ii) a predetermined temperature profile in a part bed, while a sintered part is being formed, irrespective of the density of the part formed, to negate undesirable "growth" on the part, was not then known.

Because the "SLS-window" is critically defined by the requirements of the SLS process, the part bed (and sometimes the feed bed) is heated to near $T_s$ to negate the proclivity of the sintered layer to "curl". To minimize the curling of a slice as it lies on a part bed, it has been discovered that a critical temperature profile is to be maintained in the bed, with a slight but narrowly specified temperature gradient on either side of a horizontal zone through the portion of the bed occupied by the sintered part, referred to as the "hot" zone.

The typical gradient in a part bed in a SLS machine is first positive, that is, the temperature increases to a maximum, then the gradient is negative, that is the temperature decreases from the maximum. The upper temperature gradient in the upper portion of the bed is positive, that is the temperature increases until it reaches a maximum temperature $T_{max}$ in the hot zone. The lower temperature gradient in the lower portion of the bed is negative, that is the temperature decreases from $Tma_x$ in the hot zone to the bottom of the bed.

More specifically, the temperature in the upper portion of the bed progressively increases as one moves downward from the upper surface of the bed to $T_{max}$; then progressively decreases as one moves downward from $T_{max}$ to the bottom surface of the part bed, which surface is in contact with the bed-supporting piston.

The gradient in a conventional SLS machine without controlled gas-cooling of the part bed, in each direction is typically greater than 2° C./cm (5° C./in). Such a gradient was found to be too high to provide an acceptable risk of distortion of the part.

These considerations lead to temperature limits in the feed and part beds which limits define the G'-window and SLS-window, namely, (i) the temperature at which the part bed is maintained, and the temperature profile therein, and (ii) the temperature at which the feed bed is maintained.

In turn, the temperature at which the part bed is maintained is defined by (a) a lower (minimum) part bed temperature below which curling is so pronounced as to negate any reasonable probability of effecting a slicewise fusion of plural vertically contiguous slices; and, (b) an upper (maximum) temperature at which interparticle viscosity in the part bed makes it so "sticky" as to fuzz (obfuscate) the predetermined boundaries of the part to be made. All sintered powder between vertically spaced apart lateral planes in the part bed is solidified sufficiently to have mechanical strength. The remaining unsintered powder remains freely-flowable.

The "improved" sinterable tailored powder provides not only the specified particle size and two-tier distribution, but also a usable and desirable SLS-window. The ability of a powder simultaneously to satisfy each of the requirements, provides a measure of how "good" the chance that a powder will be sinterable in the SLS Process to yield a near-fully dense, but porous article.

A major practical consequence of the narrowly defined window requires that the part bed be maintained at a specified temperature and with a specified temperature profile so that each layer to be sintered lies within the confines of the SLS-window. A different temperature, whether higher or lower, and/or a different temperature profile, results in regions of the just-sintered initial slice of powder which will either cause a sintered slice to melt and be distorted in a layer of the part bed which has "caked"; or, will cause a sintered slice to curl if the part bed temperature is too low. In the past this has been an all too common occurrence with the result that an undesirable part was made. The tailored powder and unique bed which it forms now make production of an unacceptable part an uncommon occurrence.

SUMMARY OF THE INVENTION

A laser-sinterable semi-crystalline synthetic resinous powder (referred to as a "tailored powder"), having substantially spherical particles with narrowly defined parameters of size range, particle size distribution, molecular weight range, molecular weight distribution and SLS-window is found to overcome the disadvantages of known powders used to form a sintered part in a SLS machine. The unexpected effect of providing a SLS powder which has a defined SLS-window is evidenced in the ability to predict the sinterability of the powder with a laser generated at a wavelength which is absorbed sufficiently to heat particles of the powder to their critical storage modulus $G'_c$ when the outer portion of the particles have the viscosity required to be cohesively sintered.

The unexpected effect of the two-tier particle size distribution and the critical requirement that the number average ratio of particles smaller than $53\mu m$ be $>80\%$ that is, more than 80% of all the particles in the powder be smaller than $53\mu m$, is that the powder is not only freely flowable onto the part bed so as to be presented to the laser beam in the SLS-window, but also forms a bed of desired porosity which (i) allows passage of a low pressure inert cooling gas to keep the bed from overheating, and (ii) provides the desired absorption of infra-red energy from the laser beam to yield a near-fully dense slice. A specified temperature profile is maintained in the part bed with the flow-through inert cooling gas stream, but the tailored SLS powder is sintered with a conventional SLS protocol. The powder yields a sintered article which is porous but so nearfully dense that the porous article has strength characteristics which unexpectedly mimic (are substantially the same as) those of an isotropically molded, fully dense article of the same powder.

It is therefore a primary object of this invention to provide a near-fully dense part in a SLS machine, the part formed from a semicrystalline or substantially crystalline synthetic resinous SLS powder having tailored properties uniquely adapted to the purpose at hand.

It is a general object of this invention to provide a bed of tailored powder of a semi-crystalline unblended polymer having the following critical physical properties: (a) a major portion by weight of the powder, and preferably essentially all the powder having a sphericity in the range from greater than 0.5 to 0.9, and a two-tier particle size distribution of primary particles having an average diameter smaller from than $180\mu m$, with substantially no particles $>180\mu m$, provided further that the number average ratio of particles smaller than $53\mu m$ is greater than 80%, preferably greater than 90%, and most preferably greater than 95%, the remaining particles being in the size range from $53\mu m$ to $180\mu m$; a layer of the powder no more than $250\mu m$ deep absorbs essentially all infra-red energy at the $10.6\mu m$ wavelength beamed therethrough, and absorbs more than 50% of that energy in a layer no more than $180\mu m$ thick; (b) a crystallinity in the range from 10% to 90%, preferably from 15% to 60%, a number average molecular weight in the range from about 30,000 to 500,000, preferably 60,000300,000, and a molecular weight distribution in the range from 1 to 5, preferably from 1.2 to 3; and, (c) a "SLS-window" in the temperature range from 2° C.–25° C. between the softening temperature $T_s$ of the powder and its "caking temperature" $T_c$, such that the powder has a "flow time" of $<20$ sec for 100 g in a funnel test (ASTM D189561T) at a temperature near $T_s$ in a range from 70° C. to 220° C., but below the powder's $T_c$; and, (d) a melt viscosity in the range from $100$–$10^4$ poise (10–1000 Pa-sec) when the temperature of the powder being sintered exceeds $T_c$ in less time than is required to melt contiguous large particles $>53\mu m$.

The numerical value of the storage modulus $G'_s$ for the tailored powder is much lower than the value of $G'$ at room temperature, and the temperature at which $G'_s$ is measured is in preferably the range from 5° C. to 25° C. below the $G'_c$ temperature of the powder.

It is also a general object of this invention to provide a bed of tailored powder in a laser-sintering zone, the bed having the foregoing defined characteristics which are evidenced in: (i) a "SLS-window" in the range from $T_s$ to $T_c$; and, (ii) a 'part bed' in which the sintered part is removably embedded while it dissipates heat to generate a temperature profile defined by sequential positive and negative temperature gradients, in a vertical plane through the part bed; such a gradient occurs when the uppermost slice is less than $250\mu m$ thick, and is near $T_s$ of the powder, and the temperature of the sintered part is near $T_c$. Further, the gradient from the upper surface of the part bed to the maximum temperature in the horizontal zone in which the sintered part lies, is positive, the temperature increasing at a rate in the range from 0.2° C./cm (0.5° C./in) to 2° C./cm (5° C./in) of vertical depth; and, from the maximum temperature in the horizontal zone, to the bottom of the bed, the gradient is negative, the temperature decreasing at a rate in the range from 0.2° C./cm (0.5° C./in) to 2° C./cm (5° C./in).

It has also been discovered that the tailored powder which is free-flowing at an elevated temperature below its Tg or Tm, typically at from 30° C. below $T_c$, but with some powders, as little as 2° C., is uniquely adapted to yield, when sintered by a laser beam, a nearfully dense, lasersintered article having a density in the range from 80%–95%, typically from 85%–90% of the density of a compression molded article which is deemed to be fully dense, and the mode of failure, when fractured in bending, is essentially identical to the mode of failure of an isotropically molded article of the same powder, except for cavities corresponding to the porosity of the sintered article. The sintered article may have some unsintered particles ("fuzz") adhering to its surface, but the fuzz is removable by lightly abrading the surface without changing the contours of the near-fully dense sintered article.

It is therefore another general object of this invention to produce a laser-sinterable polymer powder consisting essentially of an unblended polymer having substantially no particles $>180\mu m$ in a mass of particles in which the number average ratio of particles in the range from $1\mu m$–$53\mu m$ is greater than 80%, the remaining particles being in the size range from $53\mu m$ to $180\mu m$; and, substantial crystallinity in the range from 25% to 95%, which provides a SLS-window of from 2° C. to 25° C., and which powder when sintered in a bed with a specified temperature profile, allows each layer of powder, in the range from about $50\mu m$ (2 mil) to about $250\mu m$ (10 mils) thick, to be sintered without curling.

It is a specific object of this invention to provide a laser-sinterable unblended polymer powder tailored to have the aforespecified two-tier distribution of primary particles which have a sphericity in the range from greater than 0.5 to 0.9, a bulk density of 500 to 700 g/L, and crystallinity in the range from 15 to 90%; has a "flow time" as given, at near $T_s$ but 2° C. to 25° C. below the powder's caking temperature $T_c$; and a specified melt viscosity (shear viscosity) $>10$ Pa-sec, typically in the range from 10 pa-sec to 1000 Pa-sec, when the temperature of the powder being sintered exceeds $T_c$ in less time than is required to melt contiguous large particles $>53\mu m$; provided further that the pressure drop through a quiescent part bed 38 cm deep with a gas flow of 3–10 L/min through the bed is less than 10 kPa. The amount of gas flowed is not narrowly critical provided it is insufficient to cause channelling in the bed, or otherwise disrupt the bed, and sufficient to maintain the desired temperature profile in the bed.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

The SLS machine specifically referred to herein uses a $10.6\mu m$ $CO_2$ laser, but any other infra-red lasergenerating source may be used, as well as excimer lasers and neodymium glass lasers which generate in the near-infra-red. Powders are sintered using a $10.6\mu m$ laser in the range from 3 to 30 watts operated at a ratio of power/scan speed in the range from 0.075 watts/cm/sec to 0.3 watts/cm/sec, preferably in the range from 0.1–0.2 watts/cm/sec using a beam width in the range from 0.23–0.9 mm, preferably from 0.4–0.6 mm. Particularly with Nylons 6, 11 and 12, PBT and PA, the SLS machine is preferably operated at a fluence in the range from 1 $mJ/mm^2$ to 100 $mJ/mm^2$, more preferably from 15 $mJ/mm^2$ to 45 $mJ/mm^2$, where fluence (milliJoules/$mm^2$) is the measure of the energy of the laser beam delivered to a defined area of powder. The laser is typically operated with a beam width of 0.6 mm and a power ranging from 3–22 watts, preferably from 5–10 watts, at a scanning speed ranging from about 76.2 cm/sec to 178 cm/sec.

Among the requirements of a preferred semi-crystalline or substantially crystalline powder uniquely tailored to yield, when sintered, a porous but near-fully dense article, are the following: Free-flowing or Noncaking: The powder is freely flowable and does not cake when stored for up to 24 hr, at a temperature in the range from 2° C. to 20° C. below its caking temperature; in particular, the powder does not cake even when held from 1–8 hr in the part bed at $T_s$, at a slightly higher temperature than its storage temperature in the feed bed which latter is lower than $T_s$ of the powder. A determination as to whether a powder will meet the freeflowability requirement is made by running the timetemperature ASTM flow test referred to hereinabove. Maximum particle size and sphericity: The powder has sphericity $>0.5$ and contains essentially no particles having a nominal diameter exceeding $180\mu m$.

Figure 1:
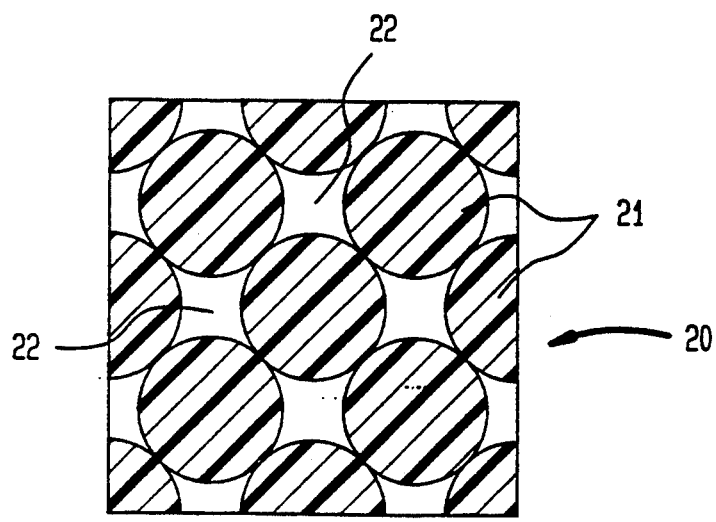
FIG. 1 is a schematic illustration of a bed of uniform spheres packed in a bed.
Figure 2:
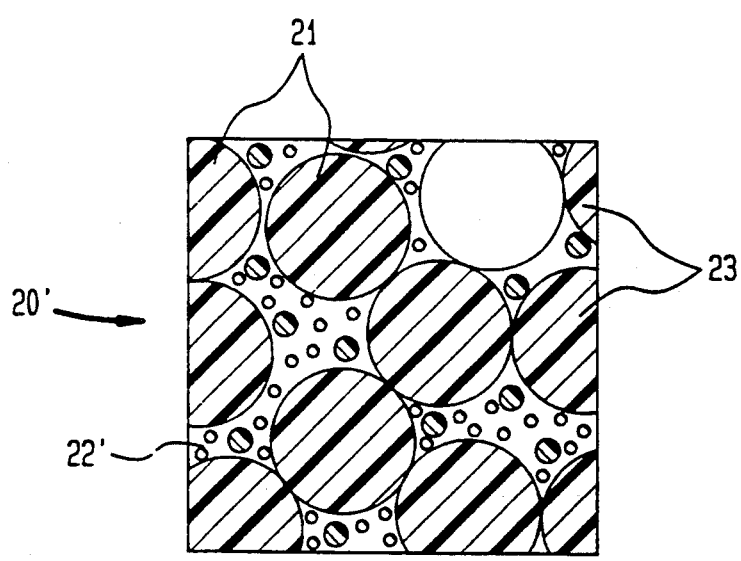
FIG. 2 is a schematic illustration of a bed of large spheres and very small ("too-small") spheres, showing that the too-small particles fit within the interstitial spaces between larger particles, and produce a bed of higher bulk density and correspondingly higher pressure drop.
Figure 3:
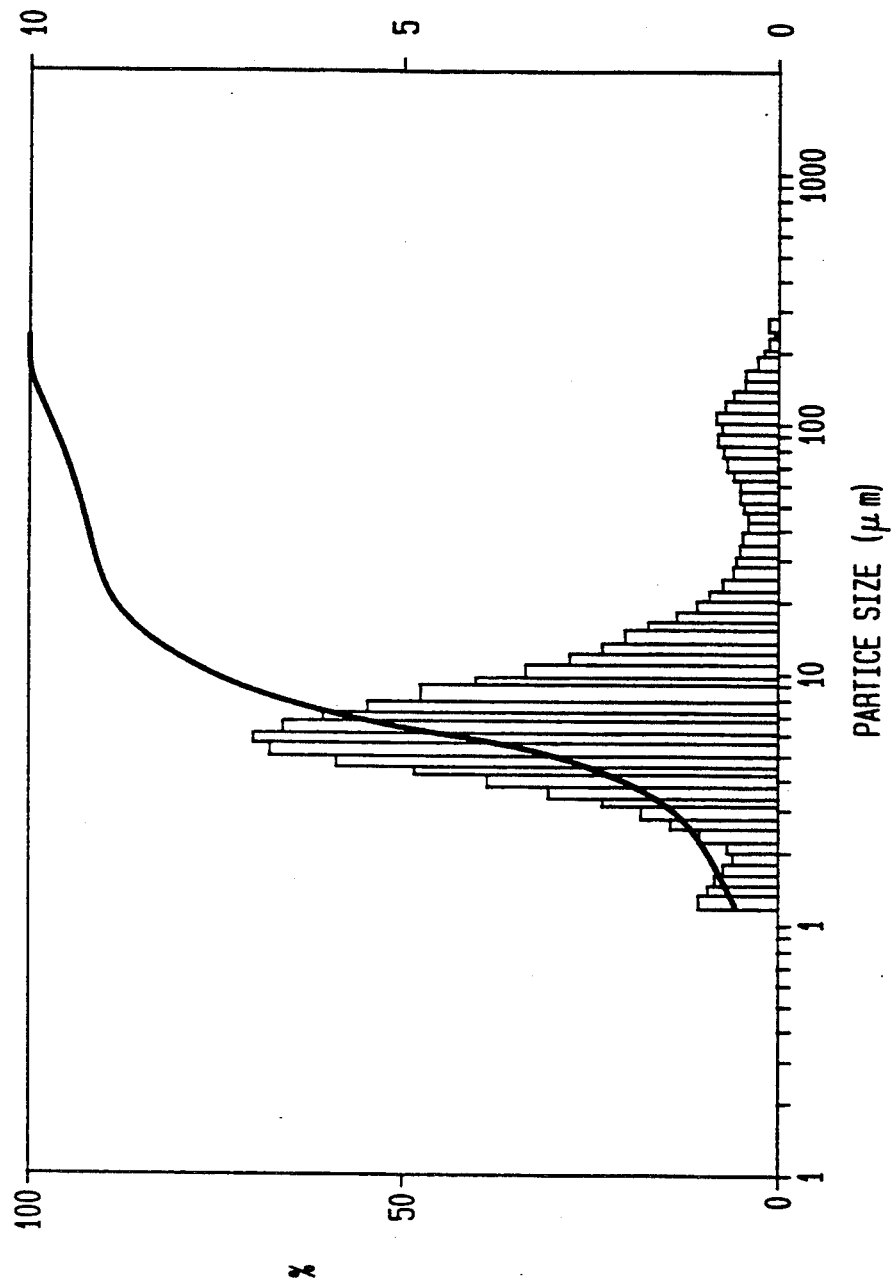
FIG. 3 is a graphical presentation of the number distribution of a particular tailored powder, namely Nylon 11.

Referring to FIG. 3 there is presented in graphical form the number average particle distribution of Nylon 11. This powder was produced from Nylon 11 (lot #R256-A02) having a number average molecular weight in the range from 75,000 to 80,000 and a molecular weight distribution in the range from 1.2–1.7.

The Nylon 11 was ground in a manner which produces a mixture of relatively coarse particles having a sphericity greater than 0.5 and a wide distribution of smaller particles. The mixture was then sieved to eliminate substantially all particles larger than 180μm, and the remaining particles were classified so as to conform to the number distribution shown in FIG. 3. The size distribution of the particles is obtained with a Malvern instrument which measures the size of the particles with a laser beam. Flowability in the SLS-window: The melt viscous flow of polymer powder on the surface of a slice heated by the laser is determined by maintaining a temperature balance. For good interdiffusion of the polymer chains (sufficient to provide particle-to-particle adhesion, and layer-tolayer adhesion), a low melt viscosity is desirable. However, part definition is lost if significant melting occurs because the melt cannot be tightly confined near boundaries of the part being formed. Sintering is effected without means to assure isolation of the desired part features.

The SLS-window is of importance at this step (and step 1) because the temperatures of both beds, the feed bed and the part bed are elevated. Since the temperature of the part bed is elevated to the softening point of the powder to minimize curling, the wider the SLS-window, the greater the processing latitude provided by the powder. Maintaining the balance of properties in a tailored powder permits the requisite particle-to-particle fusion within a layer, and also layer-to-layer fusion, both of which are necessary to make a porous but near-fully dense part.

Figure 4:
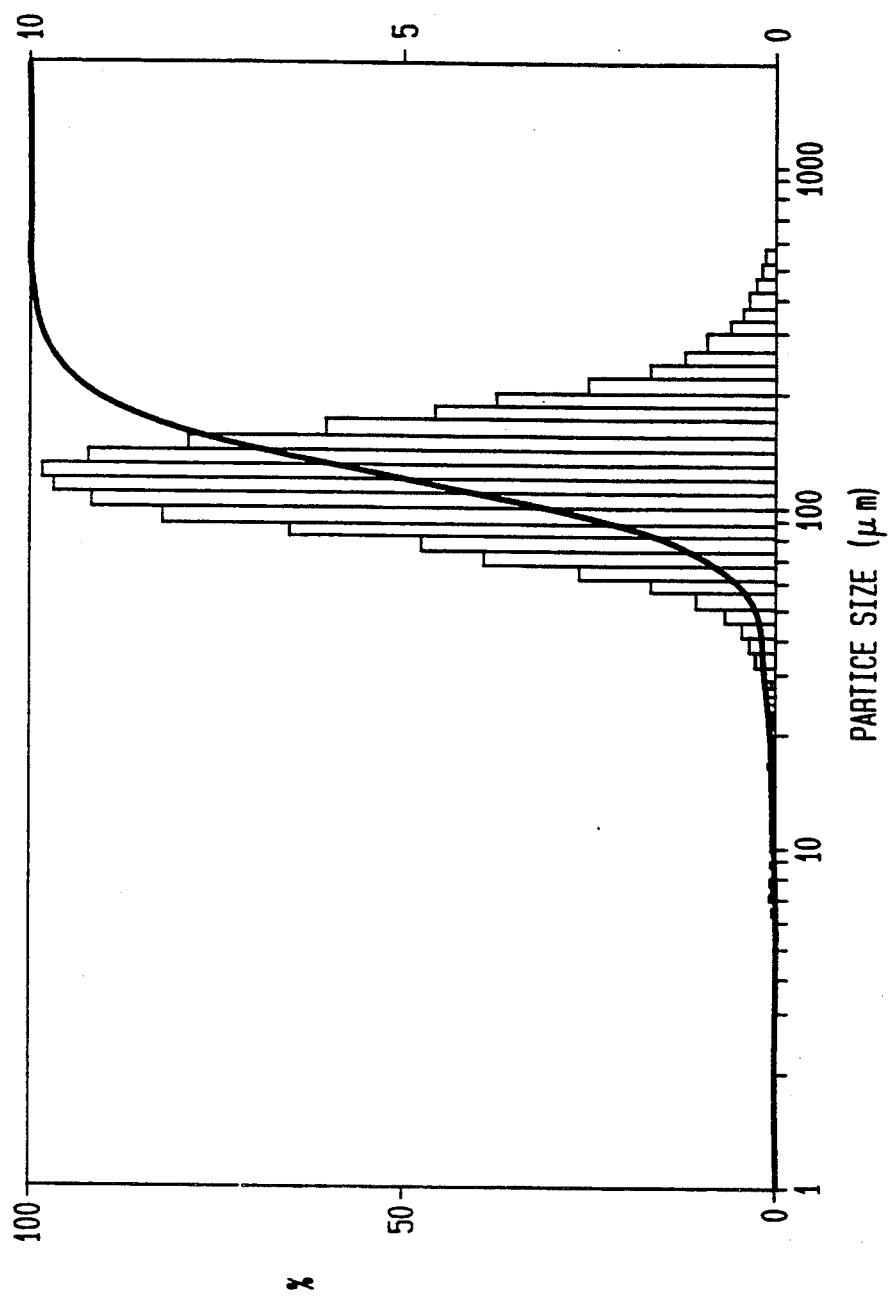
FIG. 4 is a graphical presentation of the volume distribution of the same powder for which the number distribution is illustrated in FIG. 3.

Referring to FIG. 4 there is shown a volume distribution curve of the same particles for which the number distribution is illustrated in FIG. 3, to show why the powder is freely flowable and how much of the volume in a bed of particles is occupied by "large particles". It appears that the few large particles are mainly responsible for rolling out the small particles with them, and also for permitting the essentially unobstructed passage of inert gas downwardly through the bed. Growth: Since the finished (sintered) three-dimensional (3-D) part(s) are formed in the part bed in which the unsintered powder provides mechanical support for the sintered part, the part is subject to the thermal changes in the part bed due to the presence of the sintered part. Sequential, sudden heating of successive slices of powder in a thermally insulated environment causes the bed temperature to rise. The insulating environment is due to the sintered part being surrounded by a mass of porous powder which is a good insulator. When the temperature around the sintered part is either not low enough, or too high, the sintered part will distort due to thermal stresses in the bed. In addition, if the surfaces of the hot sintered part are too hot, there are agglomerations of fused particles adhering to and scattered as "growth" over the surfaces of the finished part, which growth must be removed and this can usually only be done by machining the growth away. When some "growth" does occur with the use of a tailored powder, the growth is so slight that it can be removed without damage to the surfaces of the part so that the surfaces are smooth to the touch. If there is substantial growth, the part made is scrapped.

That the presence of large particles is critical in the two-tier distribution will be understood when it is realized that too-small particles, if not rollingly deposited on the part bed, would get packed and obstruct flow of the inert gas. The effect of being rollingly deposited layer upon layer, referred to as "layer-wise", onto the surface of the bed results in a "fluffy" bed which is dynamically stable but quiescent and relatively porous. The bed densities of a powder when not rollingly deposited are typically at least 20% higher than that of a bed of rollingly deposited powder.

A bed of such particles, when packed, are more quickly heated and over-heated (because of their small mass). The over-heated particles are then easily fused to the surface of the sintered part as "growth". The importance of controlling the top-to-bottom temperature profile within the part bed will be better understood by reference to FIG. 5.

The preferred crystallinity of a tailored powder which produces a near-fully dense sintered part with minimal growth is that which is correlatable to an observed heat of melting by DSC in the range from 20–120 cals/gm preferably from 30–60 cals/gm.

Figure 5:
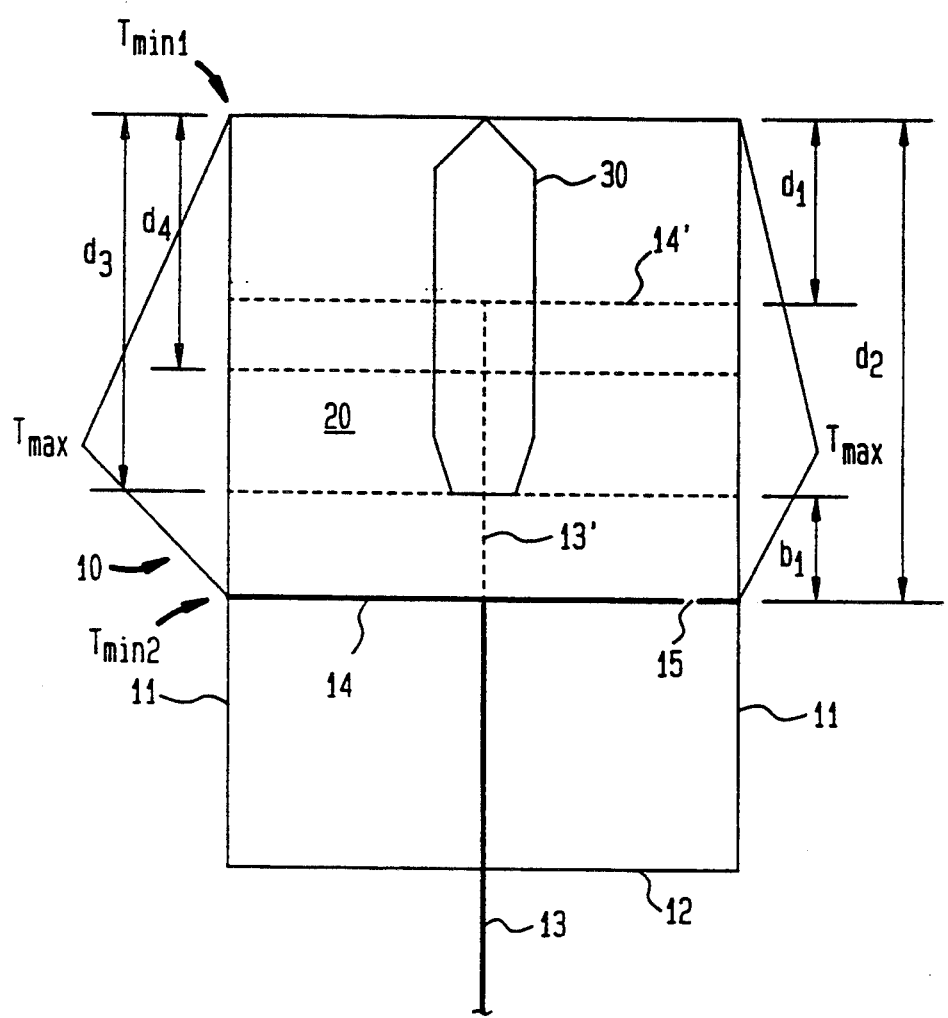
FIG. 5 is a schematic illustration of an elevational cross-sectional view of a cylindrical part bed of a SLS machine showing the position of the bed-supporting cylinder near the top of the cylinder at the beginning of the sintering procedure, and after the sintered part is formed; along with indications of the temperature profile within the bed for the tailored powder of this invention used with a conventional SLS procedure (on the left) without exteriorly controlling the temperature profile; and for the tailored powder with exterior temperature control of the bed temperature profile (right hand side).

Referring to FIG. 5 there is shown schematically, in cross-sectional view, a cylindrical part bed referred to generally by reference numeral 10, having sidewalls 11 and a bottom 12 through the center of which is slidably inserted a piston rod 13 having a piston 14 with a flat horizontal surface which supports a bed of thermooxidatively degradable powder 20. A through-passage having a relatively large diameter in the range from about 2.5 cm to 3.5 cm has a porous sintered metal disc 15 press-fitted into it to provide essentially free-flow of an inert gas, preferably nitrogen or argon, through it. A typical part bed has a diameter of 30.5 cm, and the travel of the piston from the bottom 12 to the top of the walls 11 is 38.1 cm.

A cylindrical part 30 with tapered ends, the bottom being truncated, is formed by sintering layer upon layer of preheated tailored powder, starting with the piston in the position indicated by its phantom outline at 14', supporting a bed of preheated powder about 10 cm deep, indicated by the depth $d_1$. The powder and walls of the cylinder are heated by infrared heating means to keep the temperature of the bed about 10° C. below the sticky temperature of the powder. However, it is difficult to heat the piston within the cylinder so that the piston is typically at a slightly lower temperature than the powder. Further, the mass of the piston provides a heat sink to which the bottom layer of powder dissipates heat faster than any other layer. The upper surface of the bed is in the same plane as the top of the cylinder over which the roller (not shown) of the SLS machine distributes powder from the feed bed (also not shown).

As layer upon layer of powder is sintered, forming sequential horizontal slices of the sintered part 30, the piston 14' moves downwards until finally the part is completely sintered. The sintered part 30 is thus supported on the bed of powder on the bottom, and the depth of this lower portion of the bed is indicated as being $b_1$. This bed is the same initially presented as the target, and its depth $b_1$ remains numerically equal to the depth $d_1$ when the piston 14 has moved down to a depth indicated by $d_2$. The sintered part 30 rests on the bed of powder $b_1$ thick, the bottom of the sintered part being at a depth $d_3$.

Referring now to the result of a conventional SLS procedure, there is formed a hot sintered part 30 dissipating heat to the powder 20 surrounding it in unsteady state heat transfer. The lower portion $b_1$ forms a relatively cool zone of powder which dissipates heat to the piston 14, and through which powder heat from the part 30 is relatively well dissipated by convection currents through the bed $b_1$.

As soon as sintering is completed, the upper portion of the bed having depth $d_4$, particularly near the surface, begins to dissipate heat from part 30 lying within upper portion $d_4$. Heat dissipated by the part 30 is transferred relatively well mainly by convection currents through the upper portion $d_4$ of the powder bed 20, and less effectively through lower portion $b_1$.

The portion of the sintered part 30 lying in the intermediate portion of the bed 20, that is, the portion between the bed depths $d_1$ and $b_1$, is relatively well insulated by the surrounding powder. Heat from the part 30 causes the temperature to rise so that a maximum temperature $T_{max}$ is reached. The temperature at the surface of the relatively quickly cooling upper portion of the bed, is indicated by $T_{min1}$ and the temperature of the relatively quickly cooling lower portion of the bed $b_1$ is indicated by $T_{min2}$. It is thus seen that a temperature profile is established in the bed, the maximum temperature being substantially above the lowest temperatures in the profile, and located in a horizontal zone intermediate the upper and lower surfaces of the bed.

In the conventional SLS procedure, using the novel tailored powder, there is no forced cooling of the heated bed with gas so that a typical gradient between $T_{min1}$ and $T_{max}$, and between $T_{max}$ and $T_{min2}$ is more than 2° C./cm in each case (on either side of $T_{max}$). For example, if $T_{min1}$ at the upper surface after sintering is 175° C., $T_{max}$ is 182° C. and $T_{min2}$ is about 171° C. Because $T_{max}$ is very close to the melting point 183° C. of the powder, the sintered part is exposed to a high likelihood of being distorted. It will be evident that a large part of this powder could not be sintered successfully in a conventional SLS bed because $T_{max}$ will exceed $T_c$ and the part will distort.

In FIG. 5, on the left hand side thereof, the straight lines drawn connecting the temperatures at the surface and bottom of the bed, are drawn on the assumption that the gradient is a straight line, which it most probably is not, but the linear representation serves as an approximation to focus the fact that the gradient is steeper for the conventional SLS procedure than it is for the novel procedure in which an inert cooling gas is flowed through the bed while the part is being sintered.

In the procedure with forced cooling, using the novel tailored powder, the porosity of the bed permits forced cooling of the heated bed with inert gas, so that a typical gradient between $T_{min1}$ and $T_{max}$, and between $T_{max}$ and $T_{min2}$ is less than 2° C./cm in each case. For example, if $T_{min1}$ at the upper surface after sintering is 175° C., $T_{max}$ is 177° C. and $T_{min2}$ is about 173° C. Because $T_{max}$ is not close to the melting point 183° C. of the powder, the sintered part is not likely to be distorted.

The temperature profile for the process conditions using the inert cooling gas are shown on the right hand side of FIG. 5, where it is seen that the gradient to $T_{max}$ is less, and $T_{max}$ itself is lower than it was in the conventional SLS process. Thus, the risk of part distortion and growth (on the surface) is minimized as is the thermal degradation to the powder surrounding the sintered part. Such thermal degradation occurs when the powder is overheated, that is, too far past its softening point, even if it is not heated past its $G'_c$ temperature.

Figure 6:
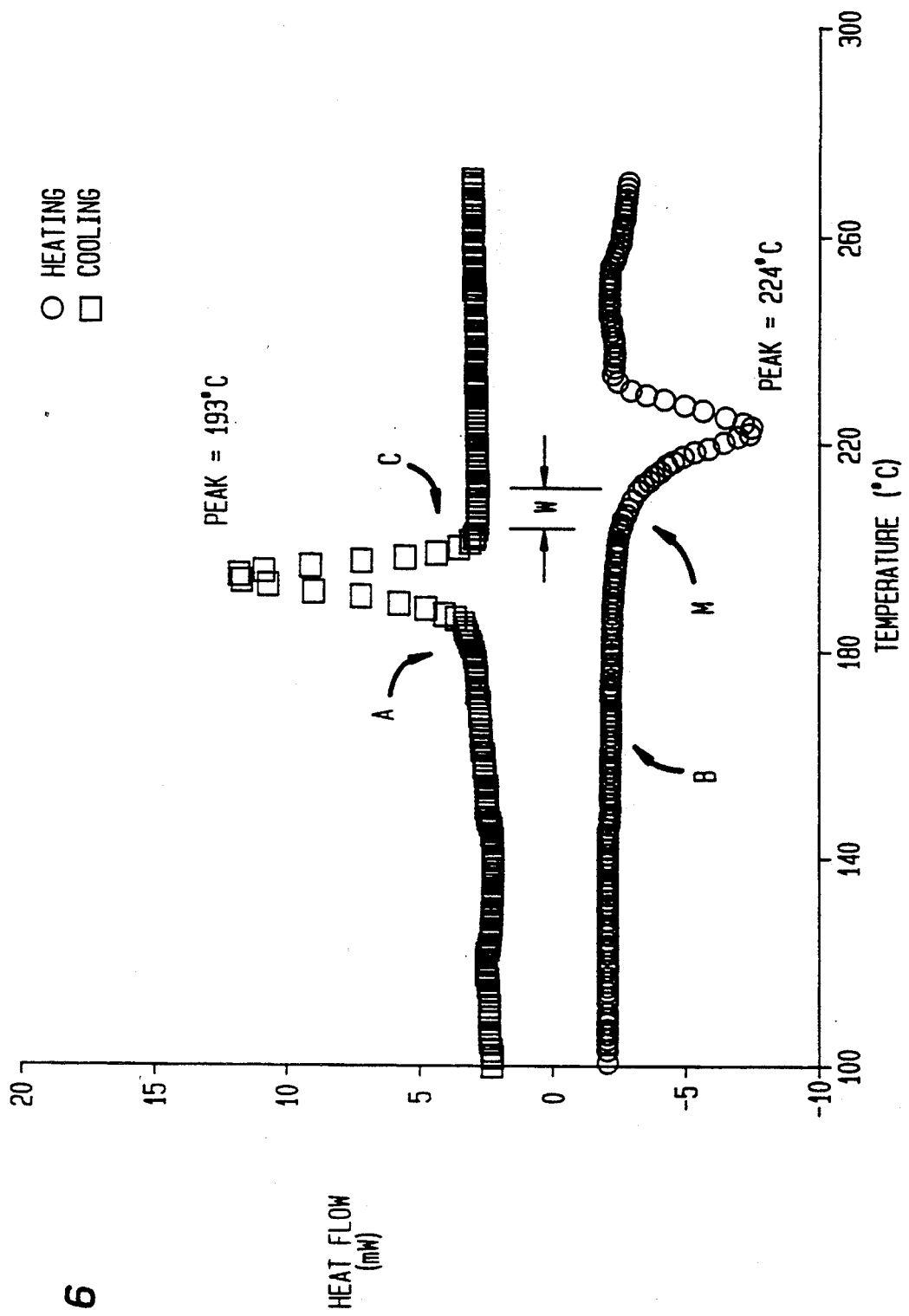
FIG. 6 shows DSC scans for the heating and cooling curves of a laser sinterable PBT powder.

To put the foregoing details in perspective, one may evoke a physical picture of the SLS-window by reference to FIG. 6 in which curve A (plotted with squares to track heat flow) represents the cooling curve for a sample of tailored PBT powder. The peak occurs at 193° C., but supercooling commences near the temperature 202° C., a point indicated by the arrow C ($T_s$). Curve B (plotted with circles) represents the heating curve for the same sample. The peak occurs at 224° C., but onset of melting commences near the temperature 212° C., a point indicated by the arrow M ($T_c$). Thus, the window W is provided by the difference in the temperatures at M and C, which for this sample of PBT is 10° C.

The following results were obtained when Nylon 11 having a molecular weight Mn of about 80,000; Mw/Mn =1.6, and $G'_c = 2 \times 10^6$ dynes/cm² at 175° C. was sintered into test bars with a beam width of 0.6 mm, the laser power set at 8 watts and a scan speed of 175 cm/sec. The values for four sets of bars are averaged in Table 1 (on pg 33).

Other preferred semi-crystalline polymers which are successfully tailored for use in the SLS machine are polybutylene terephtalate (PBT); polypropylene (PP); and polyacetal (PA). The preferred mean primary particle diameter for each of the tailored powders is in the range from 80μm–100μm. The values for these powders are given in the following Table 2.

TABLE 2

| Powder | $T_s$, °C. | $T_c$, °C. | SLS window, °C. |
|---|---|---|---|
| Nylon 11 | 153 | 170 | 17 |
| PBT | 195 | 210 | 15 |
| PA | 150 | 157 | 7 |

Each of the foregoing tailored powders was used to make sintered bars 10 cm long, 2.5 cm wide and 3 cm thick. A statistically significant number of bars were made from each powder and tested to compare the sintered bars with bars of identical dimensions but compression molded. The results with PBT are set forth in the following Table 3:

TABLE 3

| Comparison of Physical Properties of Sintered and Compression Molded Test Bars of PBT | | |
|---|---|---|
| | Sintered | Injection Molded* |
| Density, g/cm³ | 1.19 | 1.31 |
| Flexural Modulus, psi | $2.99 \times 10^5$ | $3.80 \times 10^5$ |
| Max. Stress at yield, psi | $8.3 \times 10^3$ | $14.7 \times 10^{3}$** |
| Notched Izod, ft-lb/in | 0.29 | 0.70 |
| HDT, °C. | 206 | 163** |

*supplier's data - no compression molded data available.
**value of max stress yield for injection molded sample would be higher because of chain orientation; value of HDT is different because the sample preparation and thermal is different because the sample preparation and thermal history is different from applicants' sample.

The conditions for sintering test bars from several different semicrystalline materials, each of which having a different window of sinterability is provided in the following Table 4 (presented on pg 34). In each case, the SLS machine was operated with a laser having a beam width of 0.6 cm, at its maximum power (22 watts) and a scan speed of from 127–178 cm/sec (50–70 in/sec), maximum power being used so as to finish sintering test bars in the least possible time. In each case the bars were sintered in a part bed having a diameter of 30 cm which can hold powder to a depth of 37.5 cm. In each case, the powder was maintained in the feed bed at below $T_s$ and the powder was transferred by a roller to the part bed, the surface of which was near $T_s$. In each case, the bed was heated by an external electric heater to bring it up to temperature. In each case, note that the density of the sintered part is about 90% of the density of a molded, fully dense, part. Even better physical properties are obtained when the parts are sintered at lower power and slower scan speed (lower fluence).

Having thus provided a general discussion, described the critical requirements of a laser-sinterable powder in detail, and illustrated the invention with specific examples of the best mode of making and using the powder, it will be evident that the invention has provided an effective solution to a difficult problem. It is therefore to be understood that the claims are not to be limited to a slavish duplication of the invention and no undue restrictions are to be imposed by reason of the specific embodiments illustrated and discussed.

TABLE 1

| | Value | |
|---|---|---|
| Property | Laser Sintered | Compression Molded |
| Thermal | | |
| Glass Transition (°C.) | | |
| Melt (onset, °C.) | | |
| Heat Distortion | | |
| @ 264 psi (°C.) | 46, 46 | 41, 41 |
| @ 66 psi (°C.) | 163, 167 | 163, 159 |
| TGA (onset of degradation) | not measured | |
| Mechanical | | |
| Tensile (5 mm/min crosshead) | | |
| Modulus (psi) [σ] | 201,100 [10,540] | 207,700 [11,630] |
| Elongation, ultimate (%) | 28.0 [5.3] | 201.6 [151] |
| Strength (psi) | 6323 [157] | 6315 [115] |
| Elongation, yield (%) | 26.0 [3.3] | 30.0 [1.3] |
| Energy to break (lb-in) | 205 [53] | 2,149 [316] |
| Tensile (50 mm/min crosshead) | | |
| Modulus (psi) | 221,500 [28,610] | 227,800 [18,890] |
| Elongation, ultimate (%) | 27.0 [5.5] | 271.8 [146.3] |
| Strength (psi) | 6413 [130] | 6200 [517] |
| Elongation, yield (%) | 24.1 [3.2] | 21.9 [9.3] |
| Energy to break (lb-in) | 203 [43] | 1,995 [566] |
| Flexural | | |
| Modulus (psi) | 146,800 [4147] | 176,900 [4368] |
| Strength (psi) | 7154 [159] | 7044 [271] |
| Elongation, yield (%) | .091 [.002] | .065 [.002] |
| Izod Impact (notched) | | |
| @ 23° C. (ft-lb/in) | 1.4 [.2] | 1.89 [.24] |
| @ −40° C. (ft-lb/in) | 1.03 [.2] | |
| Physical | | |
| Specific Gravity | 1.0204 [.004] | 1.0360 [.0004] |

TABLE 4

| Ex | Polymer | Feed Bed Temp. °C. | Part Bed Temp. °C. | Part Dens. gm/cm³ | Full Dens. gm/cm³ | Notch Impact | HDT °C. | MAX STRESS psi | FLEX MOD psi |
|---|---|---|---|---|---|---|---|---|---|
| 1 | Nylon 6 | 140 | 180 | 0.958 | 1.04 | 1.5 | 175 | 11510 | 272100 |
| 2 | Nylon 11 | 135 | 165 | 0.919 | 0.987 | 1.67 | 166 | 8310 | 159900 |
| 3 | Nylon 12 | 75 | 160 | 0.90 | 1.01 | 0.39 | 163 | 8120 | 150750 |
| 4 | P'Acetal | 130 | 150 | 1.283 | 1.41 | 0.72 | 149 | 9468 | 312400 |
| 5 | PBT | 160 | 195 | 1.19 | 1.31 | 0.29 | 206 | 8270 | 299700 |

*(ft-lb/in): Izod impact, notched - measured at 23° C.

We claim:

1. A laser-sinterable powder product, adapted to be sintered in a selective laser sintering machine to form a sintered part, said powder consisting essentially of an unblended .polymer which provides signs of crystalline order under X-ray examination, and shows a crystalline melting point Tm as well as a glass transition temperature Tg, said polymer having a two-tier particle size distribution said powder having the following properties: (a) freely-flowable semi-crystalline powder having a crystallinity in the range from 10–90% measured by [DSC] differential scanning calorimetry; (b) a major portion by weight of the powder having a sphericity in the range from greater than 0.5 to 0.9, and a two-tier distribution in which substantially no primary particles has an average diameter greater than 180μm, provided further that the number average ratio of particles smaller than 53μm is greater than 80%, the remaining larger particles being in the size range from 53μm to 180μm; a layer of said powder no more than 250μm deep absorbing essentially all infra-red energy beamed therethrough at a wavelength of 10.6μm, and a layer of said powder no more than 180μm thick absorbing more than 50% of said energy; (c) a number average molecular weight in the range from about 30,000 to 500,000, and a molecular weight distribution $M_w/M_n$ in the range from 1 to 5; and, (d) a window of sinterability in the temperature range from near said powder's softening temperature $T_s$ to said powder's caking temperature $T_c$; whereby when said powder is sintered layer-wise in said window of sinterability to form a slice, it will not curl.

2. The laser-sinterable powder product of claim 1, essentially all of which has a sphericity in the range from greater than 0.5 to 0.9, and is freely flowable near said softening temperature $T_s \pm 5°$ C.; said number average ratio of particles smaller than 53μm is greater than 90%, said crystallinity is in the range from 15% to 60%, said molecular weight distribution is in the range from 1.2 to 3, said window of sinterability is in the range from 2°–25° C., and, said powder's storage modulus $G'_c$ is in the range from $1 \times 10^6$ dynes/cm² to $3 \times 10^6$ dynes/cm² when the temperature of said powder being sintered exceeds $T_c$ in less time than is required to melt contiguous large particles >53μm.

3. The laser-sinterable powder of claim 2 wherein the mean primary particle diameter is in the range from 80μm–100μm.

4. The laser-sinterable powder of claim 3 wherein said powder is selected from the group consisting of Nylons 6, 11, 12, polybutylene terephthalate, and polyacetal and said window of sinterability is in the range from 5°–20° C.

5. A bed of a laser-sinterable powder in a selective laser sintering zone, said bed consisting essentially of particles of an unblended synthetic resinous material which provides signs Of crystalline order under X-ray examination, and shows a crystalline melting point Tm as well as a glass transition temperature Tg, said material in particulate form having a two-tier particle size distribution from which powder, a laser-sintered part is formed and removably embedded in said bed, said powder being a freely-flowable semi-crystalline powder having primary particles in the size range smaller than 180μm and a sphericity in the range from greater than 0.5 to 0.9, provided further that the number average ratio of particles smaller than 53μm is greater than 80%, the remaining larger particles being in the size range from 53μm to 180μm; having a crystallinity measured by differential scanning calorimetry in the range from 10% to 90%, and when sufficiently heated, having a softening temperature $T_s$, and a caking temperature $T_c$ from about 2°–25° C. above $T_s$, and, when sintered, has a melt viscosity in the range from 100-10⁴ poise (10-1000 Pa-sec) when said powder's temperature as it is being sintered, exceeds $T_c$ in less time than is required to melt contiguous large particles >53μm; said bed having a porosity in the range from 0.4 to 0.55, and providing, during operation, a temperature profile defined by sequential positive and negative temperature gradients in a vertical plane through upper and lower portions of said bed, respectively, when said bed's uppermost layer, less than 25082 m thick, is in the range from near said $T_s$ to said $T_c$; said bed maintaining said positive temperature gradient from said upper surface to a maximum temperature in a horizontal zone in which said sintered part lies, said upper temperature gradient being in the range 0.2° C./cm (0.5° C./in) to 2° C./cm (5° C./in); and, said bed maintaining a negative temperature gradient from said maximum temperature to the bottom of said bed, said negative lower temperature gradient being in the range from 0.2° C./cm (0.5° C./in) to 2° C./cm (5° C./in).

6. A bed of a laser-sinterable powder in a selective laser sintering zone, said bed consisting essentially of finely divided particles of an unblended synthetic resinous material which provides signs of crystalline order under X-ray examination, and Shows a crystalline melting point Tm as well as a glass transition temperature Tg, said material in finely divided particulate form having a two-tier particle size distribution from which particles a laser-sintered part is formed, said powder being a freely-flowable semi-crystalline powder having a crystallinity measured by differential scanning calorimetry in the range from 10% to 90%, said powder having primary particles in the size range smaller than 180μm, having a sphericity in the range from greater than 0.5 to 0.9, provided further that the number average ratio of particles smaller than 53μm is greater than 80%, the remaining larger particles being in the size range from 53μm to 180μm; said bed having a porosity in the range from 0.4 to 0.55 allowing a pressure drop of less than 6.89 kPa when cooling gas is flowed in a direction from top to bottom through said bed at a rate of 5 L/min and said bed is 30 cm deep.

7. The bed of powder of claim 6 wherein said powder is selected from the group consisting of Nylons 6, 11, 12, polybutylene terephthalate, and polyacetal and said window of sinterability is in the range from 7°-17° C.

8. The bed of powder of claim 7 wherein said powder is Nylon 11 having a number average molecular weight in the range from 75,000 to 80,000 and a molecular weight distribution in the range from 1.2-1.7.

9. A laser-sintered article or 'part' of arbitrary shape sintered in a selective laser sintering machine containing a laser-sinterable powder of a semi-crystalline synthetic resin, said part consisting essentially of a sintered mass of said powder, said part having a density in the range from 80% to 90% of the density of an isotropically molded part of said powder and fracture surfaces, when broken by bending, which are visually identical to fracture surfaces of said molded part but including a profusion of cavities having an average diameter in the range from 1μm-30μm randomly scattered throughout said part which has substantially the same flexural modulus and maximum stress at yield (psi) when fractured in bending, but substantially less ultimate elongation (%), and notched Izod impact (ftlb/in), than a compression molded article molded from a portion of said powder.

10. The laser-sintered article of claim 9 wherein said article is free from growth on its surfaces which are smooth to the touch.

11. The laser-sintered article of claim 10 wherein said powder consists essentially of an unblended polymer having a two-tier particle size distribution said powder having the following properties: (a) freely-flowable semi-crystalline powder having a crystallinity in the range from 10-90% measured by differential scanning calorimetry; (b) a major portion by weight of the powder having a sphericity in the range from greater than 0.5 to 0.9, and a two-tier distribution in which substantially no primary particles having an average diameter greater than 180μm, provided further that the number average ratio of particles smaller than 53μm is greater than 80%, the remaining larger particles being in the size range from 53μm to 180μm; a layer of said powder no more than 250μm deep absorbing essentially all infra-red energy beamed therethrough at a wavelength of 10.6μm, and a layer of said powder no more than 180μm thick absorbing more than 50% of said energy; and, (b) a number average molecular weight in the range from about 30,000 to 500,000, and a molecular weight distribution $M_w/M_n$ in the range from 1 to 5; (c) a window of sinterability in the temperature range from near said powder's softening temperature $T_s$ to said powder's caking temperature $T_c$.

12. The laser-sintered article of claim 11 wherein said powder consists essentially of an unblended polymer having a two-tier particle size distribution said powder having the following properties: (a) freely-flowable semi-crystalline powder having a crystallinity in the range from 10-90% measured by differential scanning calorimetry; (b) a major portion by weight of the powder having a sphericity in the range from greater than 0.5 to 0.9, and a two-tier distribution in which substantially no primary particles having an average diameter greater than 180μm, provided further that the number average ratio of particles smaller than 53μm is greater than 80%, the remaining larger particles being in the size range from 53μm to 180μm; a layer of said powder no more than 250μm deep absorbing essentially all infra-red energy beamed therethrough at a wavelength of 10.6μm, and a layer of said powder no more than 180μm thick absorbing more than 50% of said energy; (b) a number average molecular weight in the range from about 30,00 to 500,000, and a molecular weight distribution $M_w/M_n$ in the range from 1 to 5; and, (c) a melt viscosity in the range from 100-10⁴ poise (10-1000 Pa-sec) when the powder being sintered exceeds $T_c$ in less time than is required to melt contiguous large particles >53μm.

13. The laser-sintered article of claim 12 wherein said article is essentially distortion-free having no linear dimension of a part and no dimension of a surface out of plane by more than ±250μm (20 mils).

14. The laser-sinterable powder product of claim 13 wherein said crystallinity is in the range from 15-60%.

15. The laser-sinterable powder product of claim 2 wherein said crystallinity is in the range from 15-60%.

16. The bed of powder of claim 7 wherein said crystallinity is in the range from 15-60%.

* * * * *